US011831820B2

(12) United States Patent
Sakaguchi et al.

(10) Patent No.: US 11,831,820 B2
(45) Date of Patent: Nov. 28, 2023

(54) INFORMATION PROCESSING METHOD THAT ASSOCIATES AN IMAGE RECORDING DEVICE WITH A MESSAGE APPLICATION GROUP, INFORMATION PROCESSING SYSTEM, INFORMATION PROCESSING DEVICE, AND NON-TRANSITORY COMPUTER-READABLE STORAGE MEDIUM

(71) Applicant: CANON KABUSHIKI KAISHA, Tokyo (JP)

(72) Inventors: Mayato Sakaguchi, Kanagawa (JP); Kohei Onishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/852,811

(22) Filed: Jun. 29, 2022

(65) Prior Publication Data
US 2023/0007131 A1    Jan. 5, 2023

(30) Foreign Application Priority Data

Jun. 30, 2021 (JP) ................................. 2021-109413

(51) Int. Cl.
*H04N 1/00* (2006.01)
*G06F 3/12* (2006.01)
*H04L 51/02* (2022.01)

(52) U.S. Cl.
CPC ....... *H04N 1/00212* (2013.01); *G06F 3/1205* (2013.01); *G06F 3/1238* (2013.01); *G06F 3/1253* (2013.01); *H04L 51/02* (2013.01)

(58) Field of Classification Search
None
See application file for complete search history.

(56) References Cited

U.S. PATENT DOCUMENTS

| 2019/0258431 | A1* | 8/2019 | Yamamoto | ............ H04L 67/025 |
| 2020/0099643 | A1* | 3/2020 | Makino | ................ H04L 51/224 |
| 2020/0236228 | A1* | 7/2020 | Awatsu | .................... H04L 51/02 |
| 2021/0344622 | A1* | 11/2021 | Mann | ............... G06Q 10/06313 |
| 2021/0409556 | A1* | 12/2021 | Ushinohama | ......... H04L 51/046 |
| 2022/0027100 | A1* | 1/2022 | Abe | ...................... G06F 3/1292 |
| 2022/0078292 | A1* | 3/2022 | Nishiyama | ........... H04N 1/0044 |
| 2022/0109644 | A1* | 4/2022 | Zhang | ...................... H04L 63/10 |
| 2022/0393998 | A1* | 12/2022 | Tsukada | ............ H04N 1/00212 |
| 2023/0066018 | A1* | 3/2023 | Ushinohama | ...... H04N 1/32128 |
| 2023/0259313 | A1* | 8/2023 | Yamamoto | ............ G06F 3/1238 358/1.15 |

FOREIGN PATENT DOCUMENTS

JP       2019144697 A      8/2019

\* cited by examiner

*Primary Examiner* — Henok Shiferaw
(74) *Attorney, Agent, or Firm* — Venable LLP

(57) ABSTRACT

There is provided an information processing method executed by an information processing system cooperatively operating with a message application. The method comprises: registering by associating a group in the message application a predetermined image recording device in response to an instruction by a first account in the group; and outputting print target data transmitted from the message application to the predetermined image recording device in response to a message transmitted by a second account in the group.

12 Claims, 14 Drawing Sheets

FIG. 6
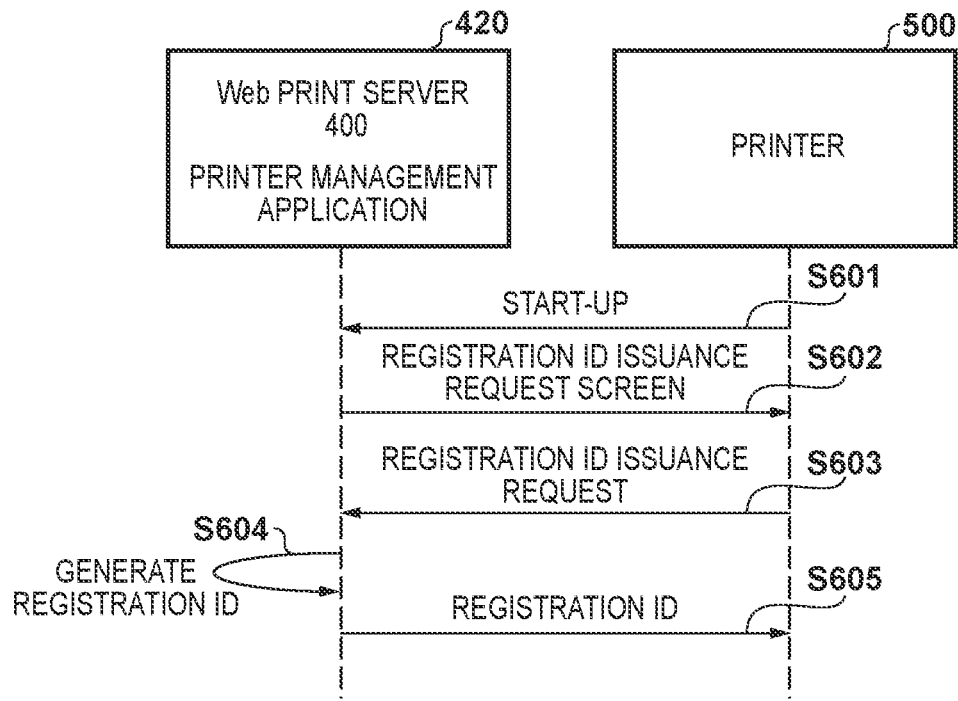
FIG. 7A
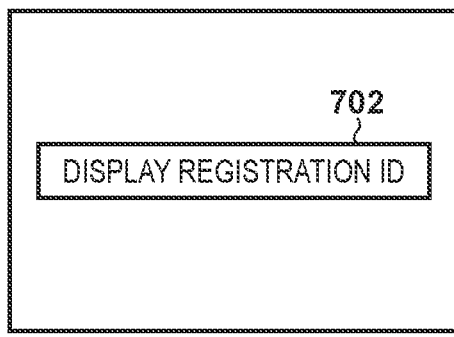
FIG. 7B
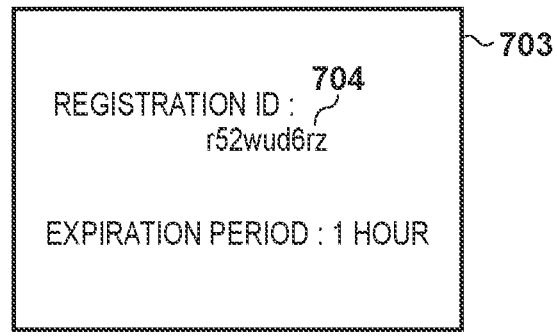
FIG. 8
| REGISTRATION ID | PRINTER ID | PRINTER MODEL | EXPIRATION PERIOD |
|---|---|---|---|
| amskri6ej | 05001 | P0001 | 2017/12/21 10:00 |
| kmbt58hr | 01052 | P0002 | 2017/12/21 10:02 |
| 2sefjr6sd | 35126 | P0001 | 2017/12/21 10:25 |
| r52wud6rz | 03679 | P0052 | 2017/12/21 10:26 |

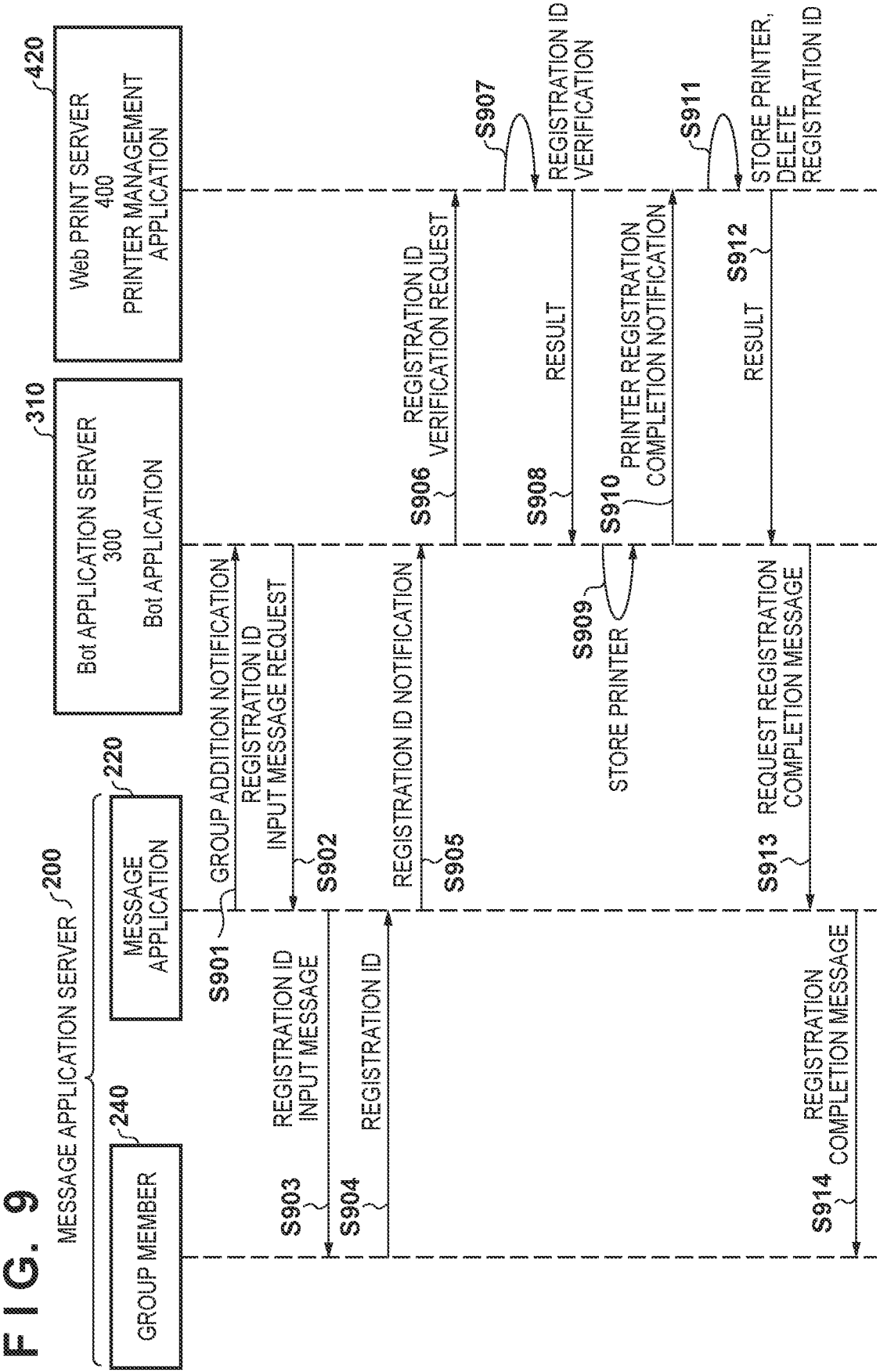

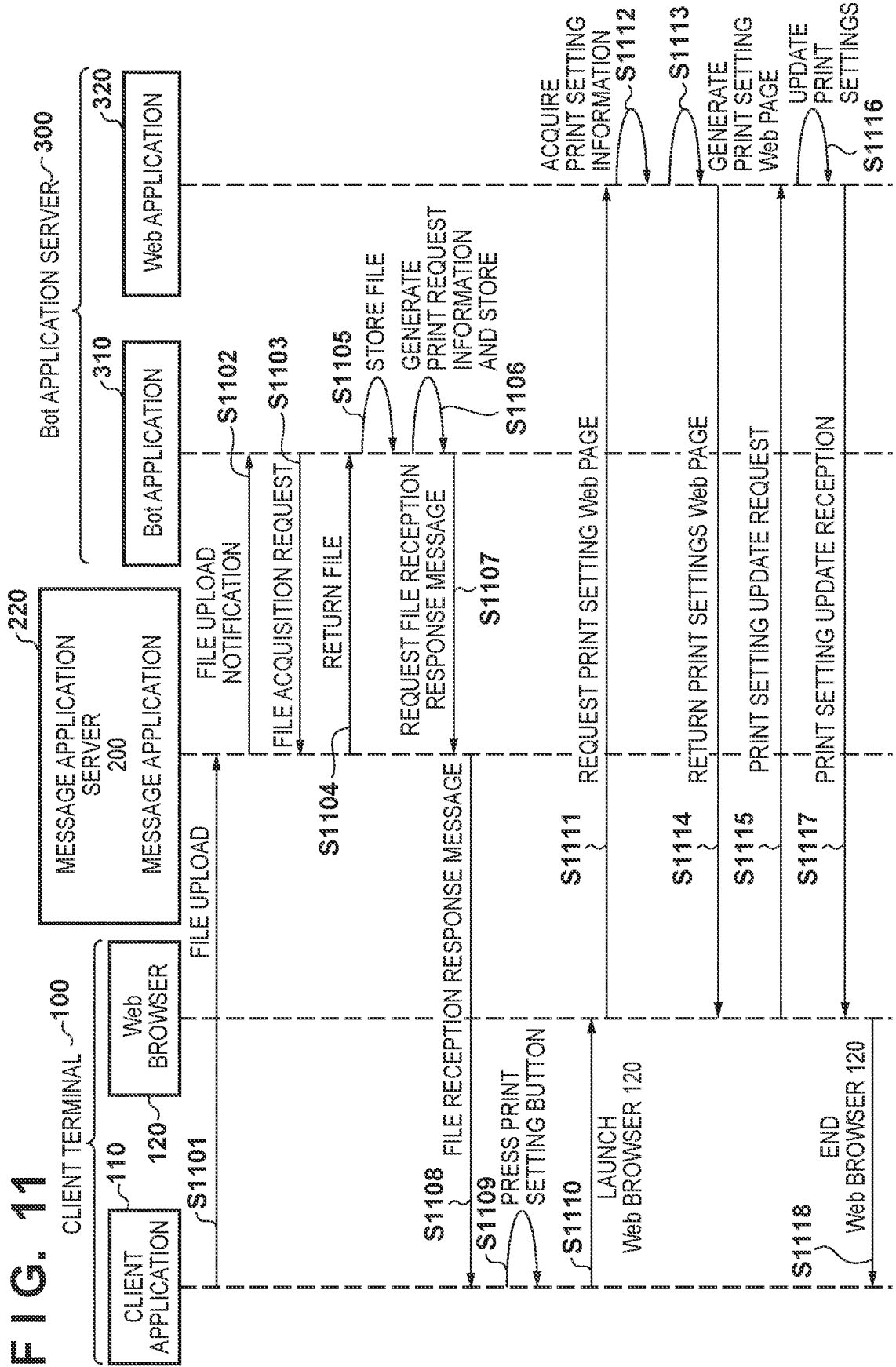

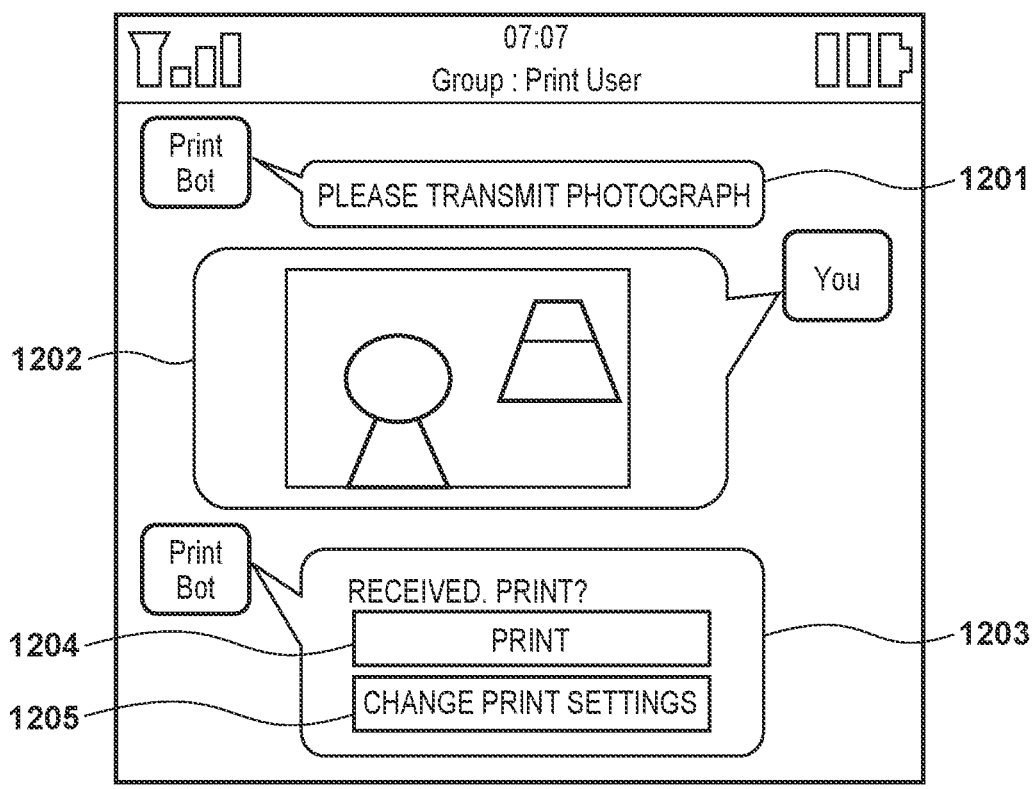
F I G. 12

INFORMATION PROCESSING METHOD THAT ASSOCIATES AN IMAGE RECORDING DEVICE WITH A MESSAGE APPLICATION GROUP, INFORMATION PROCESSING SYSTEM, INFORMATION PROCESSING DEVICE, AND NON-TRANSITORY COMPUTER-READABLE STORAGE MEDIUM

BACKGROUND OF THE INVENTION

Field of the Invention

The present invention relates to an information processing method, an information processing system, an information processing device, and a non-transitory computer-readable storage medium in a cloud printing system that prints an image received from a user via a message application with a specific printer.

Description of the Related Art

The use of a messaging application for so-called chatting in which messages are exchanged between a plurality of user terminals via a network (hereinafter simply referred to as a "message application") is widespread (Japanese Patent Laid-Open No. 2019-144697). In recent years, in such a message application, services using a bot application that automatically responds with a message in response to the content of a message transmitted to the message application by a user have been increasing. User operations on the message application using the bot application can be performed more interactively than conventional on-screen operations.

Meanwhile, with the spread of web services, printing devices such as a printer configured to perform a printing operation are being provided with a network communication function so as to make the web services available. There is provided a web print service in which a user accesses a web service from a terminal or the like and issues a print instruction to a printing device via a network.

In order to cause a printer to perform printing from the message application via the web print service, it is necessary to associate the message application with printer information registered in the web print service. A user can associate the message application with the printer information by exchanging information necessary for cooperation with the web print service with the bot application in an interactive manner.

SUMMARY OF IRE INVENTION

However, in a case where one printer is shared and used by a plurality of users, each of the users needs to individually communicate with the bot application to register the printer, which constitutes a problem of low user convenience.

An aspect of the present invention is to eliminate the above-mentioned problem with conventional technology.

A feature of the present invention is to provide a technique for sharing a printer among a plurality of users via the message application.

According to a first aspect of the present invention, there is provided an information processing method executed by an information processing system cooperatively operating with a message application, the method comprising: registering by associating a group in the message application with a predetermined image recording device in response to an instruction by a first account in the group; and outputting print target data transmitted from the message application to the predetermined image recording device in response to a message transmitted by a second account in the group.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a sequence diagram illustrating an issuance process in which a user issues a registration ID for a printer.

FIG. 7A is a diagram illustrating an example of a screen of a printer management application displayed in the issuance process of FIG. 6, FIG. 7B is a diagram illustrating an example of a screen of a printer management application displayed in the issuance process of FIG. 6.

FIG. 8 is a diagram illustrating an example of a registration ID management data table managed by a temporary storage DB, FIG. 9 is a sequence diagram illustrating a registration process of a group member and a primer.

FIG. 11 is a sequence diagram of a process of transmitting an image file from a client application, accessing a print setting web page by a response message, and changing print settings.

FIG. 12 is a diagram illustrating a message talk screen displayed by a client application.

DESCRIPTION OF THE EMBODIMENTS

Figure 1:
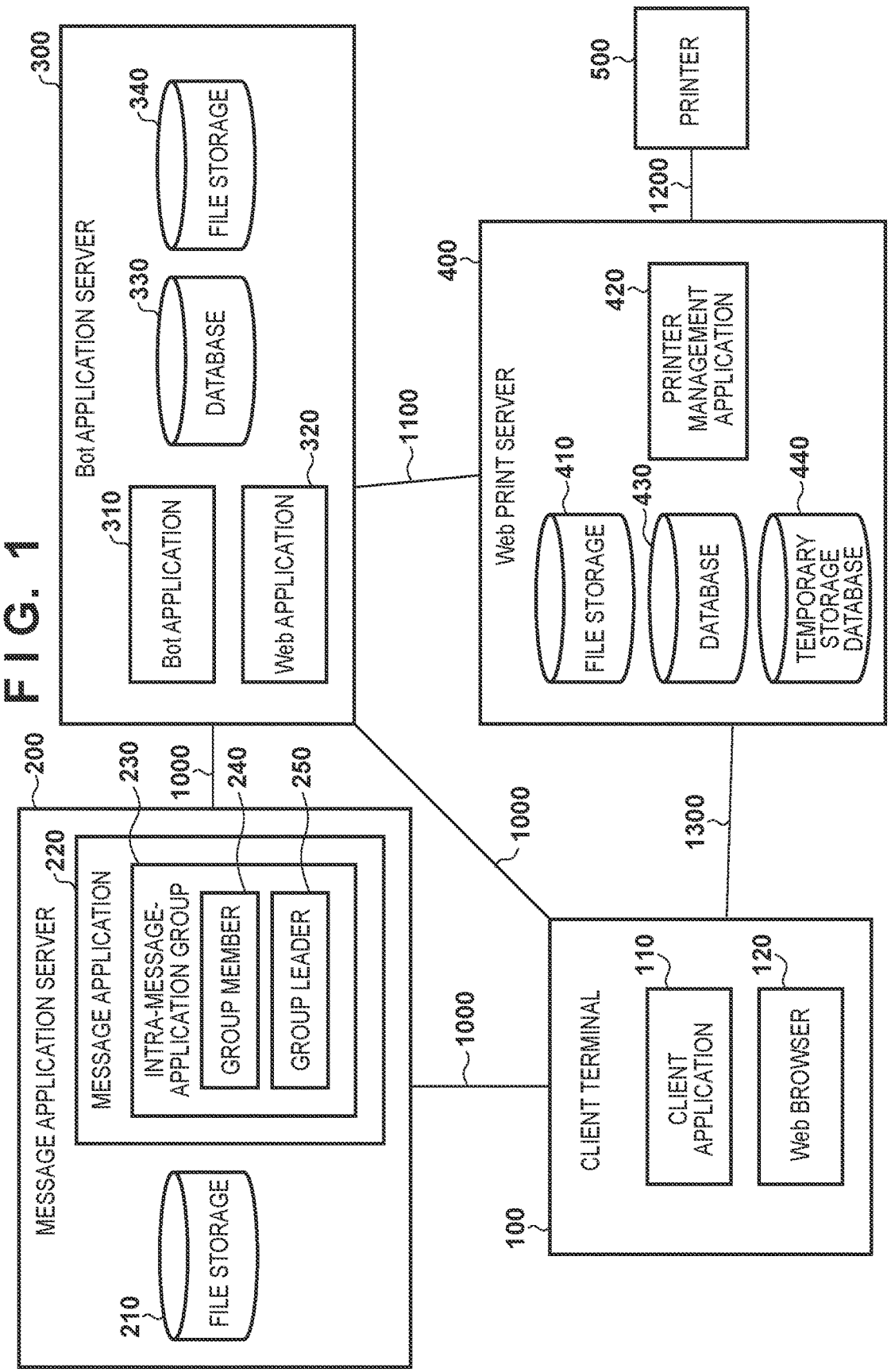
FIG. 1 is a diagram illustrating a configuration of a web print system according to the present embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

In the present embodiment, an example of an information processing system in which a web print service and a bot application of a message application cooperate with each other to output a file such as an image or a document transmitted by a user via the message application to an image recording device via a network will be described.

First, an information processing system in which a bot application server cooperates with a message application and a web print server to instruct via the web print server a predetermined printer (image recording device) to output a file transmitted from the message application.

FIG. 1 is a diagram illustrating an example of a configuration of an information processing system according to the present embodiment. The information processing system includes a client terminal 100, a message application server 200, a bot application server 300, a web print server 400, and a printer 500.

The message application server 200 is an information processing device that provides a message application service. The bot application server 300 is an information processing device that acquires print target data transmitted from the client terminal 100 via a bot account and issues a web print instruction based on a print instruction from the client terminal 100 via a message application 220. The web print server 400 is an information processing device that transmits a print instruction to the printer 500 based on the web print instruction.

In FIG. 1, the client terminal 100, the message application server 200, and the bot application server 300 are connected to each other via a network 1000.

Similarly, the bot application server 300 and the web print server 400 are connected to each other via a network 1100, and the web print server 400 and the printer 500 are connected to each other via a network 1200. The number of the client terminals 100 and the printers 500 is not limited to the example illustrated in FIG. 1, and there may be a plurality of client terminals 100 and printers 500.

The networks 1000, 1100, and 1200, and a network 1300 are composed of a combination of at least one communication network. A communication network includes, for example, a local area network (LAN) such as the Internet, a wide area network (WAN), a telephone line, a dedicated digital line, an ATM or frame relay line, a cable television line, and a wireless line for data broadcasting. The networks 1000, 1100, 1200, and 1300 may be different networks or may be configured to use an identical network. Further, the networks 1000, 1100, 1200, and 1300 may be configured to include at least one of a wired network and a wireless network, or may be composed of a plurality of types of networks.

A client application 110 of the client terminal 100 receives a user operation and transmits a message, a file, or the like input by the user operation to a message application 220 managed by the message application server 200 via the network 1000. The client application 110 also notifies a user of a message received from the message application 220 via the network 1000.

The client terminal 100 further includes a web browser 120 that is an application for displaying a web page. The web browser 120 displays a web page provided, via the network 1000, by a web application 320 included in the bot application server 300 and receives an operation from a user who uses the client terminal 100. The client terminal 100 also displays a web page provided, via the network 1300, by a printer management application 420 included in the web print server 400 and receives an operation from a user who uses the client terminal 100.

A file storage 210 included in the message application server 200 stores a file transmitted from the client application 110 of the client terminal 100.

The message application 220 receives a message or a file from the client application 110, transmits a message to the bot application 310 via the network 1000, and stores the received file in the file storage 210. Further, based on a request from the bot application 310, the message application 220 transmits a message to the client application 110 via the network 1000 and returns the file stored in the file storage 210 back to the bot application 310.

An intra-message-application group 230 included in the message application 220 integrates the client application 110 and the bot application 310 that transmit and receive information to and from the message application 220 into one group. A group member 240 is a member that belongs to the intra-message-application group 230. A plurality of intra-message-application groups 230 can be created in the message application 220, and the intra-message-application group 230 is composed of one or more group members 240. The member belonging to the group can acquire an identifier that uniquely identifies the group in the message application server 200. A message or a file transmitted by the group member 240 is shared among and equally transmitted to the group members 240 belonging to the same group. A representative account of the group member 240 is referred to as a group leader 250. Although the group leader 250 has a function similar to the group member 240, it is also possible to restrict the function of the group member 240 within the group, and give the group leader 250 a higher level of right such that only the group leader 250 has a function. That is, the group leader 250 may be a group leader account having a group management right.

The bot application 310 is an application corresponding to the bot account that receives an event notification from the message application 220 of the message application server 200 and executes a process corresponding to the content of the received event. The bot application 310 transmits a message transmission request to the message application 220 via the network 1000, as necessary. In accordance with a request from the web browser 120 of the client terminal 100, the web application 320 creates a web page based on information stored in a database 330 and returns the web page. The database 330 stores information regarding the printer 500 and print settings for each user, and the like. A file storage 340 stores a file to be printed by the printer 500.

A file storage 410 of the web print server 400 stores print job data converted into a format processable by the printer 500. The primer management application 420 manages and authenticates the printer 500 registered in an account, generates a print job based on a print request received from the bot application 310 of the bot application server 300, and transmits the print job to the printer 500. Here, account information includes at least a user ID and a password, and the printer 500 held is registered in advance by a user of the client application 110. In the present embodiment, a user holds one printer 500, but may hold a plurality of printers 500.

A database 430 records the account information registered in the printer management application 420, information regarding the printer 500 held by the account, and status information and print job information of the printer 500, and the like. A temporary storage database 440 is a database in which the printer management application 420 temporarily stores an issued registration ID and the like.

The printer 500 receives a print job notification from the printer management application 420 of the web print server 400, obtains the print job from the file storage 410, and executes printing.

Figure 2:
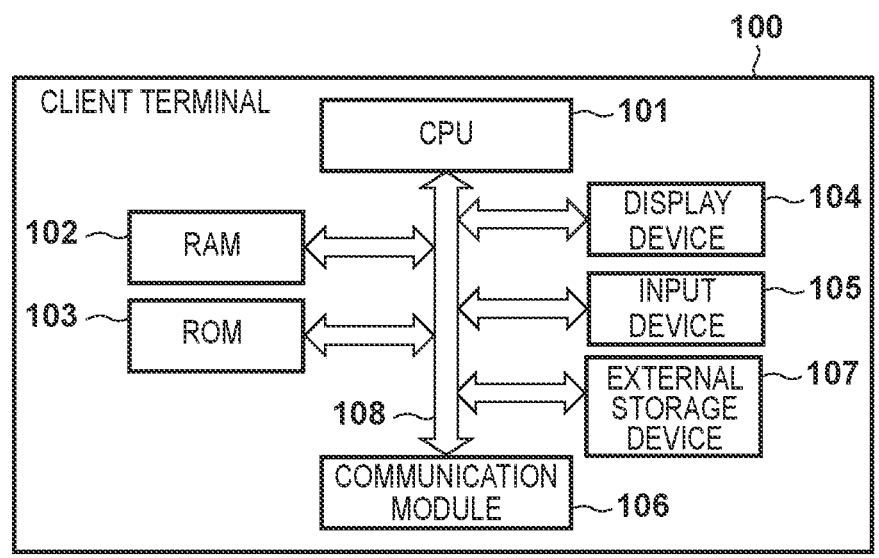
FIG. 2 is a diagram illustrating a configuration of a client terminal.

FIG. 2 is a diagram illustrating a configuration of the client terminal 100. The client terminal 100 includes a central processing unit (CPU) 101, a random access memory (RAM) 102, a read only memory (ROM) 103, a display device 104, an input device 105, a communication module 106, and an external storage device 107.

The CPU 101 performs calculation, determination, and control of data and instructions in accordance with programs stored in the RAM 102 or the ROM 103. The RAM 102 is used as a temporary storage area when the CPU 101 performs various types of processes. The ROM 103 records an operating system (OS), the client application 110, the web browser 120, and other application software.

The display device 104 includes a liquid crystal display and a graphic controller, and displays a web page downloaded from a server, a graphic user interface (GUI), and the like. Displaying a web page is performed such that the web page is downloaded to the RAM 102 by the web browser 120 and displayed on the display device 104.

The input device 105 is a device operated by a user to give various types of instructions to the client terminal 100, and is, for example, a keyboard. Alternatively, the input device 105 is a device for acquiring an image, and is, for example, a camera. The client terminal 100 receives various types of instructions by a user via the input device 105, and performs various types of controls corresponding to the instructions.

The communication module 106 is an interface to which a LAN cable is connected, and performs data communication with the message application server 200 and the bot application server 300 via a router (not illustrated) or the network 1000. Such data communication may be performed wirelessly, for example, with a wireless-compatible interface.

The external storage device 107 is a storage device that stores programs executed by the CPU 101, setting data used by the programs, user data and the like. In a case where the client terminal 100 is a smartphone, a flash memory is typically used as the external storage device 107. A system bus 108 communicatively connects the CPU 101, the RAM 102, the ROM 103, the display device 104, the input device 105, the communication module 106, and the external storage device 107.

In the client terminal 100 in FIG. 2, the display device 104 and the input device 105 are separately illustrated. However, the present invention is not limited thereto, and a touch panel display or the like in which a display device and an input device are integrated may be used. In that case, a camera device is provided separately from the touch panel display.

Figure 3:
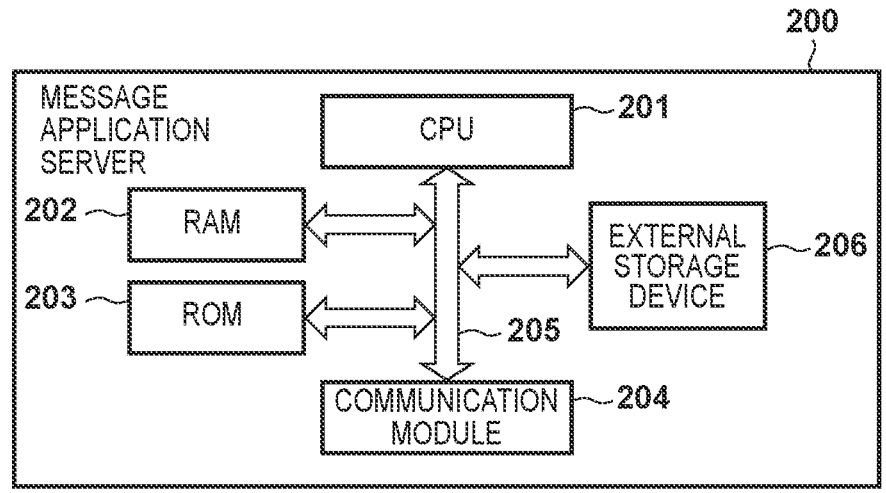
FIG. 3 is a diagram illustrating a configuration of a message application server.

FIG. 3 is a diagram illustrating a configuration of the message application server 200. The message application server 200 includes a CPU 201, a RAM 202, a ROM 203, a communication module 204, and an external storage device 206.

The CPU 201 performs calculation, determination, and control of data and instructions in accordance with programs stored in the RAM 202 or the ROM 203. The RAM 202 is used as a temporary storage area when the CPU 201 performs various types of processes. The external storage device 206 records various types of data including data of an operating system (OS), applications, and the like. The communication module 204 is an interface to which a LAN cable is connected, and performs data communication with the client terminal 100 and the bot application server 300 via a router (not illustrated) or the network 1000. Such data communication may be performed wirelessly, for example, with a wireless-compatible interface. A system bus 205 performs data exchange among the CPU 201, the RAM 202, and the ROM 203.

The hardware configurations of the bot application server 300 and the web print server 400 are similar to the hardware configuration of the message application server 200 described with reference to FIG. 3, and thus the description thereof is omitted.

Figure 4:
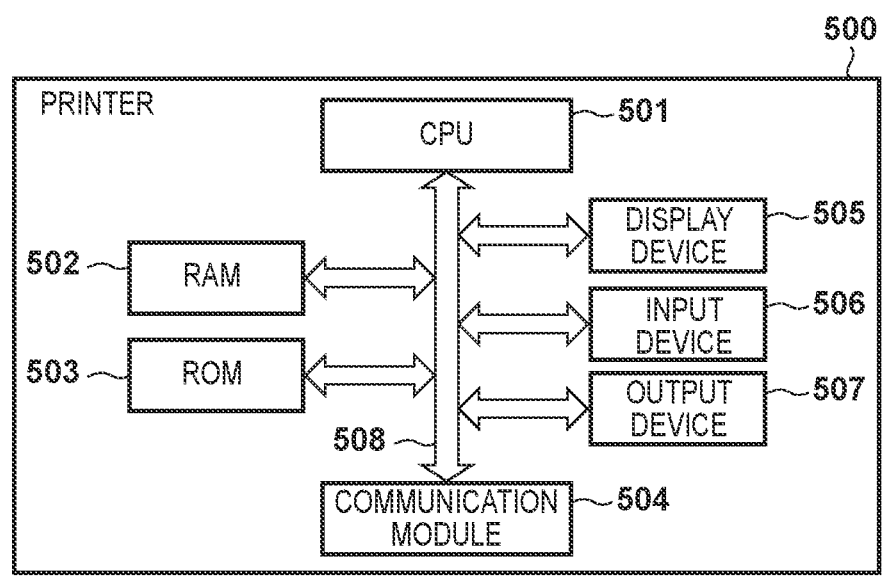
FIG. 4 is a diagram illustrating a configuration a printer.

FIG. 4 is a diagram illustrating a configuration of the printer 500. The printer 500 includes a CPU 501, a RAM 502, a ROM 503, a communication module 504, a display device 505, an input device 506, and an output device 507.

The CPU 501 performs calculation, determination, and control of data and instructions in accordance with programs stored in the RAM 502 or the ROM 503. The RAM 502 is used as a temporary storage area when the CPU 501 performs various types of processes. The ROM 503 records an operating system (OS) and other application software. The ROM 503 may be a data-rewritable non-volatile memory typified by a flash memory.

The communication module 504 is an interface to which a LAN cable is connected, and performs data communication with the web print server 400 via a router (not illustrated) or the network 1200. Such data communication may be performed wirelessly, for example, with a wireless-compatible interface.

The display device 505 displays a graphical user interface (GUI) and the like. The display device 505 may be a full-color liquid crystal display or may be composed of a small number of LEDs. The input device 506 is a panel operated by a user to give various types of instructions to the printer 500, and is, for example, hardware keys. The output device 507 is a device for forming an image on a printing paper, and is, for example, a print device.

A system bus 508 communicatively connects the CPU 501, the RAM 502, the ROM 503, the communication module 504, the display device 505, the input device 506, and the output device 507.

Figure 5:
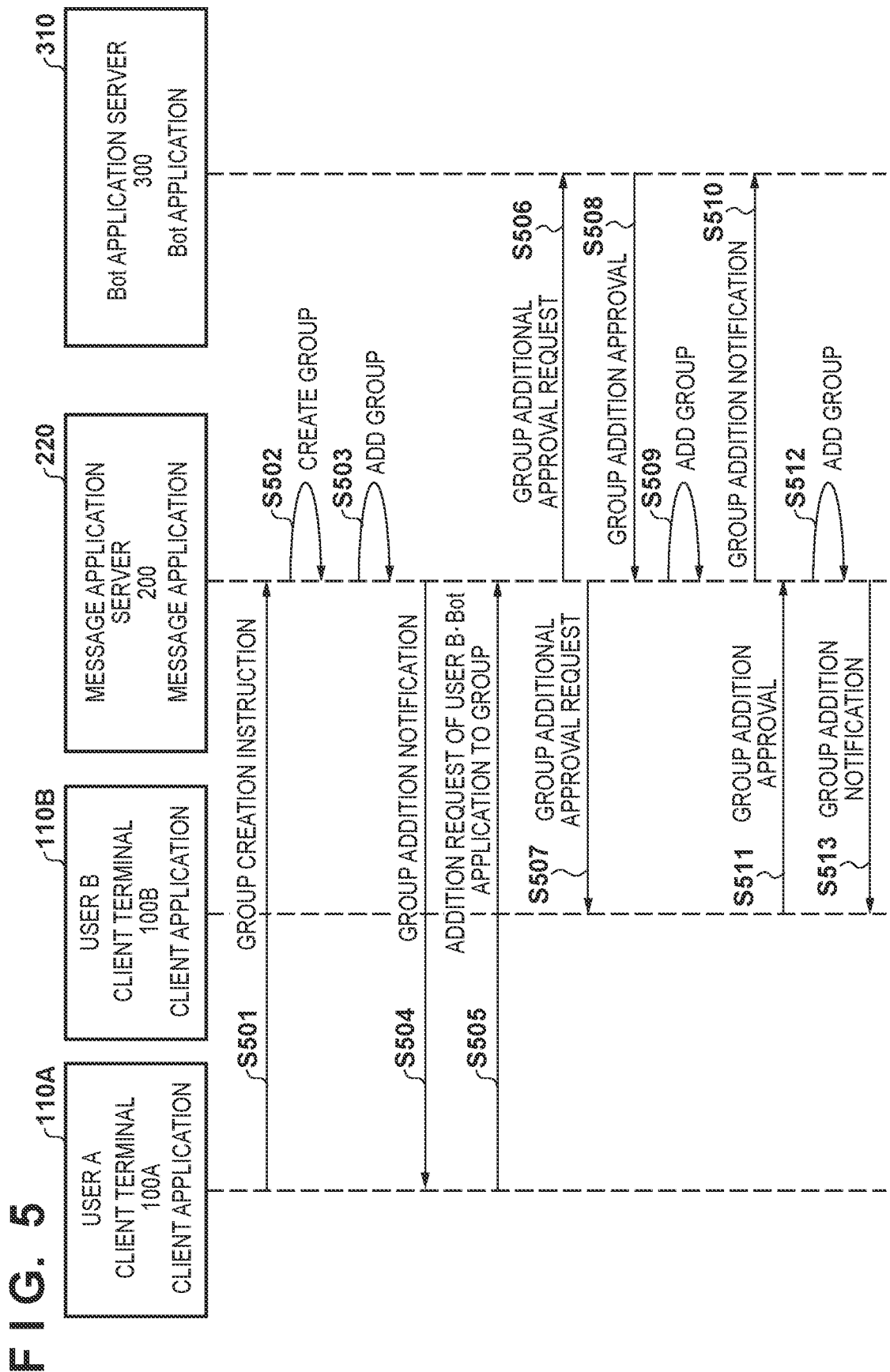
FIG. 5 is a sequence diagram of a process in which a user creates an intra-message-application group and adds a group user and a bot application.

FIG. 5 is a sequence diagram illustrating a process in which a client terminal 100A creates a group in the message application 220 based on an operation by a user A, and adds another user and the bot application 310 as members according to the present embodiment.

First, a client application 110A transmits a group creation instruction to the message application 220 of the message application server 200 based on the operation of the input device 105 by the user A (S501).

The message application 220, which has received the group creation instruction in S501, creates an intra-message-application group 230 in the message application server 200 (S502). After the creation of the group, the message application 220 adds the user A, who has transmitted the group creation instruction, to the group (S503), and transmits to the user A a group addition notification which notifies that operations of creating the group and adding the creator have been completed (S504).

Subsequently, in response to an operation by the user A, the client application 110A transmits to the message application 220 a group addition request for adding accounts corresponding to a client terminal 100B of a user B and the bot application 310 to the group created in S502 (S505). The client application 110A can specify one or more user accounts to make a group addition request. The client terminal 100 and the client application 110 may be different from those of the user A as long as respective users use the identical message application 220 to perform communication.

The message application 220, which has received the group addition request in S505, transmits a group addition approval request to the client application 110 of the user B and the bot application 310 specified (S506 and S507). The group addition approval request in S506 and S507 includes an identifier that uniquely identifies the group to join. The client application 110 of the user B and the bot application 310, which have received the group addition approval request in S506 and S507, transmit a group addition approval to the message application 220 (S508 and S511). The user B may instruct whether or not to approve the group addition approval request by operating a client application 110B. The bot application 310 may instruct whether or not to approve the group addition approval request, automatically or in accordance with an instruction by an administrator of the bot application 310. In the present embodiment, the client application 110 of the user B and the bot application 310 approve the group addition approval request.

The message application 220, which has received the group addition approval in S508 and S511, adds the accounts corresponding to the client application 110B of the user B and the bot application 310 to the group described above (S509 and S512). Subsequently, a group addition notification that notifies the completion of the addition operation is transmitted to the client application 110 of the user B and the bot application 310 (S510 and S513). Here, the message application 220 performs group addition and group addition notification in order of receipt of the group addition approval. Therefore, the group addition approval by the client application 110 of the user B (S511) and the group addition approval of the bot application 310 (S509) may be in any order.

FIG. 6 is a sequence diagram illustrating an issuance process in which a user operates the printer 500 to issue a registration ID for the printer 500 according to the present embodiment. FIGS. 7A and 7B illustrate examples of screens of the printer management application 420 in the issuance process for the registration ID for the printer 500 in the present embodiment.

Upon receiving a start-up request from the printer 500 (S601), the printer management application 420 returns a registration ID issuance request screen 701 illustrated in FIG. 7A (S602). Upon receiving a registration ID issuance request that is transmitted from the user by pressing a button 702 on the registration ID issuance request screen 701, the printer 500 transmits a registration ID issuance request to the printer management application 420 of the web print sever 400 (S603). The registration ID issuance request includes a printer ID that is a unique identifier of the printer 500 in the web print service.

Upon receiving the registration ID issuance request in S603, the printer management application 420 search the database 430 based on the printer ID included in the request, and determines whether or not the printer ID has already been registered. In a case where the printer ID has already been registered, a random value with a fixed number of digits is issued as a registration ID (S604). Further, the printer management application 420 records the registration ID issued, the printer ID, printer information retrieved from the database 430 using the printer ID as a key, and an expiration period of the registration ID in the temporary storage database 440. Then, a registration ID display screen illustrated in FIG. 7B that is a web page including the registration ID is returned to the printer 500 (S605), FIG. 8 illustrates an example of a management data table for registration IDs (registration ID table) managed by the temporary storage database 440 according to the present embodiment. A registration ID corresponding to the printer 500 is stored in a registration ID table 800. Similarly, an expiration period of the registration ID is also stored.

FIG. 9 is a sequence diagram illustrating a registration process for registering the group member 240 and the printer 500 according to the present embodiment. Here, the group member 240 performs operations via the bot application 310 and the client application 110 associated with the user A or the user B belonging to the same group as in FIG. 5.

Figure 10A:
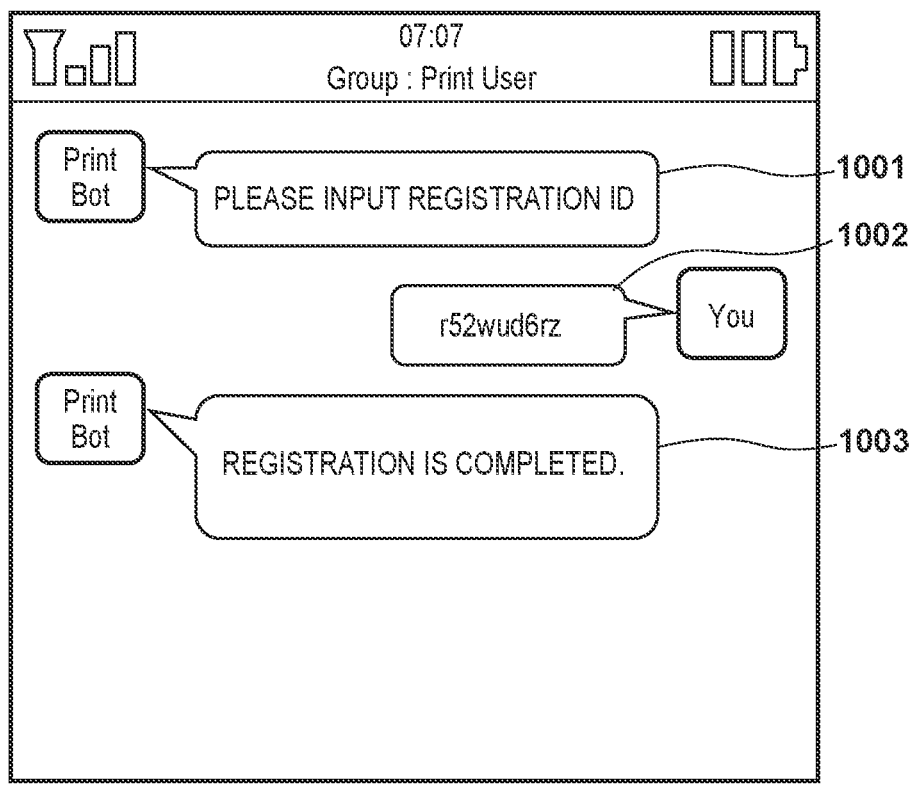
FIG. 10A is a diagram illustrating an example of a message talk screen of a client application displayed in the registration process of FIG. 9.
Figure 10B:
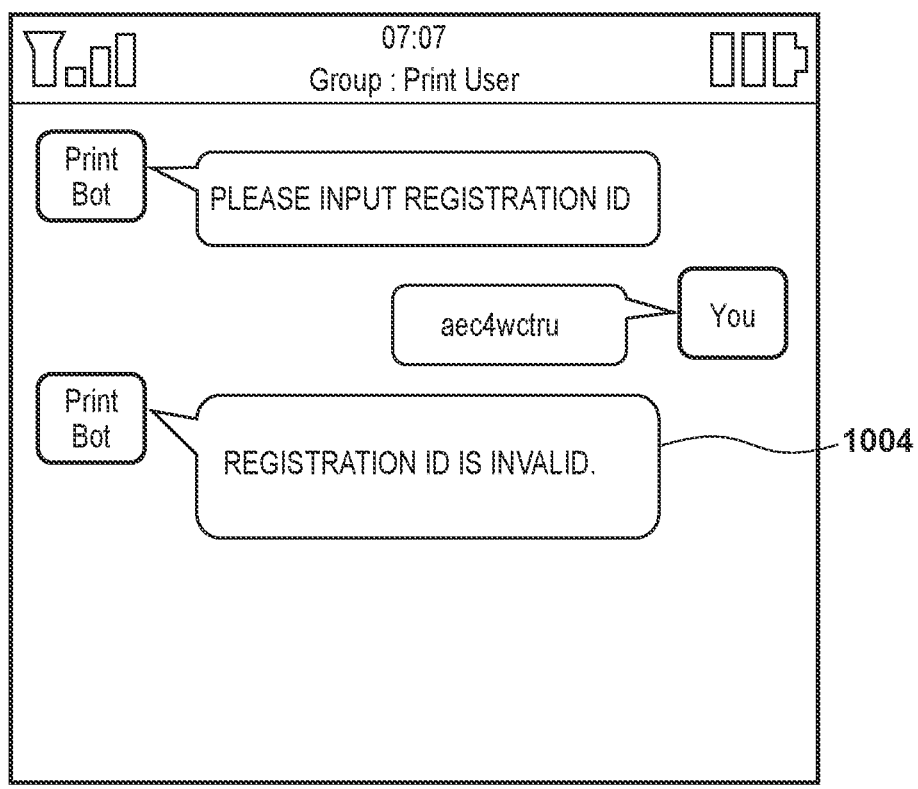
FIG. 10B is a diagram illustrating an example of a message talk screen of a client application displayed in the registration process of FIG. 9.

FIGS. 10A and 10B are examples of message talk screens displayed on the display device 104 of the client terminal 100 of the group member 240 in the registration process for registering the group member 240 and the printer 500 according to the present embodiment. In the examples of FIG. 10A and FIG. 10B, messages and files respectively transmitted from a user and a message talk partner are displayed on a time-series basis in an area called a message talk screen provided by the group member 240. Here, a balloon from the left side of the screen represents a message transmitted from the talk partner, and a balloon from the right side of the screen represents a message transmitted from the user.

After the addition of another user and the bot application 310 as group members in S509 and S512 in FIG. 5, the message application 220 transmits to the bot application 310 a group addition notification that notifies the completion of the group addition in S510 and S513 (S901).

The bot application 310, which has received the group addition notification in S901, transmits to the message application server 200 a registration ID input message request for registering the printer 500 (S902). Upon receiving a registration ID input message from the message application server 200 (S903), the group member 240 displays a registration ID input message 1001 on the message talk screen of the client application 110. Then, the user inputs a registration ID 704, displayed on a registration ID screen 703 illustrated in FIG. 7B, from the client application 110 on the client terminal 100 via a user interface. When the registration ID is input like a message 1002 illustrated in FIG. 10A, the client application 110 transmits the input registration ID to the message application 220 (S904). The registration ID is a character string that identifies a printer to be registered in the group and functions as a passcode that allows only a user who can access the printer to add the printer to the group.

The message application 220 transmits to the bot application 310 a registration ID notification regarding the registration ID received in S904 (S905). The notification transmitted in S905 includes at least unique identification information that can identify the intra-message-application group 230 that is a transmission source of the message of S905. The identification information may be unique for each intra-message-application group 230. The bot application 310, which has received the notification in S905, transmits a registration ID verification request to the printer management application 420 (S906). The request in S906 includes at least the registration ID input in S904 and an identifier information (application ID) assigned to the bot application 310 by the printer management application 420.

The printer management application 420 refers to the registration ID table 800 stored in the temporary storage database 440 and, when the registration ID received is present and the expiration period thereof has not expired, determines that the registration ID is valid (S907). For example, in a case where the registration ID is input within a predetermined time period specified in an expiration period field of the registration ID table 800, it is determined that the effective period has not expired. After determining that the registration ID received is valid, the printer management application 420 returns a determination result to the bot application 310 (S908). In a case where the registration ID is determined to be expired in expiration period in S907, that is, in a case where the registration ID is not input within a predetermined time period in S904, the printer management application 420 deletes the registration ID from the table. In a case where the registration ID is determined to be invalid in S907, the printer management application 420 aborts the registration process and transmits a registration error message to the client application 110 of the group member 240 via the message application 220. The client application 110 of the group member 240 displays a registration error message 1004 illustrated in FIG. 10B. In a case where the registration ID is determined to be valid in S907, the printer management application 420 returns printer information such as a printer ID and a printer model retrieved from the temporary storage database 440 together with a verification result in S908.

When notified that the registration ID is valid in S908, the bot application 310 stores the received printer information and the identification information of the client application 110 received in S905 in the database 330 (S909). Subsequently, the bot application 310 transmits a registration completion notification to the printer management application 420 (S910). This notification includes at least the registration ID and an application ID of the bot application 310.

Upon receiving the registration completion notification in 910, the printer management application 420 stores the printer ID and the application ID of the bot received in the database 430 (S911). Further, the printer management application 420 deletes the registration ID from the registration ID management table of the temporary storage database 440 and notifies the bot application 310 of the result (S912).

Upon receiving the notification in S912, the bot application 310 transmits a registration completion message request to the message application 220 (S913). The message application 220, which has received the registration completion message request in S913, transmits a registration completion message to the client application 110 of the group member 240 (S914). Upon receiving the registration completion message in S914, the client application 110 displays a registration completion message 1003 on the message talk screen as illustrated in FIG. 10A.

According to the processing described above, by adding a predetermined printer (image recording device) to the group of the message application, the bot application server can grasp the association between the printer and the group.

FIG. 11 is a sequence diagram illustrating an example of a process for uploading a file to the bot application server 300 by operating the client terminal 100 of the group member and performing print settings for printing the file according to the present embodiment. The client terminal 100 here is a client terminal 100 of the group member 240 belonging to the same group as the bot application 310 registered in the registration process illustrated in FIG. 9, and can communicate with the message application 220.

First, the message application 220 receives a file from the client application 110 (S1101) and transmits a file upload notification to the bot application 310 of the bot application server 300 (S1102). The notification in S1102 includes at least an identifier that can uniquely identify the intra-message-application group 230 that is a transmission source of the message of S1101, and an identifier that uniquely identifies the client application 110.

The bot application 310, which has received the notification in S1102, transmits a file acquisition request to the message application 220 (S1103). The message application 220, which has received the file acquisition request in S1103, returns a requested file to the bot application 310 (S1104). Subsequently, the bot application 310 stores the acquired file to the file storage 340 (S1105).

Next, the bot application 310 generates print request information by integrating storage destination information of the file storage 340 in which the file is stored, print initial setting information, and an identifier that uniquely identifies the client application 110 included in the notification of the S1101 Further, the bot application 310 generates an identifier for identifying the print request information, expiration period information, and a unique access URL to a web page for updating the print settings of a print request, associates them with the print request information, and stores in the database 330 (S1106). Upon completion of generation and storing of the print request information in S1106, the bot application 310 transmits to the message application 220 a file reception response message request for transmitting a file reception response message to the client application 110 (S1107).

Here, the request in S1107 includes an access identifier to the web page for updating the print settings generated in S1106 and the identifier that can individually identify the client application 110 received in the notification of S1102. An example of the access identifier is a Uniform Resource Locator (URL). The message application 220, which has received the request in S1107, transmits the file reception response message to the target client application 110 according to the identifier that can identify the client application 110 included in the request (S1108). The file reception response message includes at least information regarding the access URL to the web page for updating the print settings.

FIG. 12 illustrates an example in which the file reception response message received in S1108 in FIG. 11 is displayed on the message talk screen displayed on the display device 104 of the client terminal 100 by the client application 110.

A message 1201 in FIG. 12 is a message transmitted by the bot application 310. A message 1202 is a message indicating a file transmitted by a user in response to the message 1201 in S1101. A message 1203 is a file reception response message transmitted by the bot application 310 in response to the transmitted file in S1108. In addition to a text, user interfaces illustrated as buttons 1204 and 1205 can be arranged in the message 1203. Such a button can be configured to transmit a fixed message to a talk partner or launch the web browser 120 to allow access to a specific URL when pressed by a user.

For example, when the button 1204 in FIG. 12 is pressed, a message instructing a print request is transmitted from the client application 110 to the message application 220. Also, when the button 1205 is pressed, the web browser 120 is launched by the client application 110 with an instruction to open the access URL to the web page for updating print settings included in the file reception response message received in S1108. In the present embodiment, a description has been given on the assumption that the web browser 120 is launched to open a specific URL when a button is pressed. However, a link to the URL may be directly displayed in the message instead of the button, and the web browser 120 may be launched when a user selects the link.

When the user presses the button 1205 for changing the print settings illustrated in FIG. 12 in S1109 in FIG. 11, the client application 110 launches the web browser 120 to open the access URL to the web page for updating the print settings (S1110). The web browser 120 requests, as instructed, the web page for updating print settings to the web application 320 of the bot application server 300 (S1111).

The web application 320, which has received the request fix the web page in S1111, acquires appropriate print request information based on the requested URI, information from the database 330 (S1112). Next, the web application 320 generates a print setting web page based on print initial setting information of the print request information acquired in S1112 (S1113). The web application 320 returns the generated print setting web page as a response to the request for the print setting web page in S1111 (S1114). This causes the client terminal to display the web page for changing print settings.

Figure 13A:
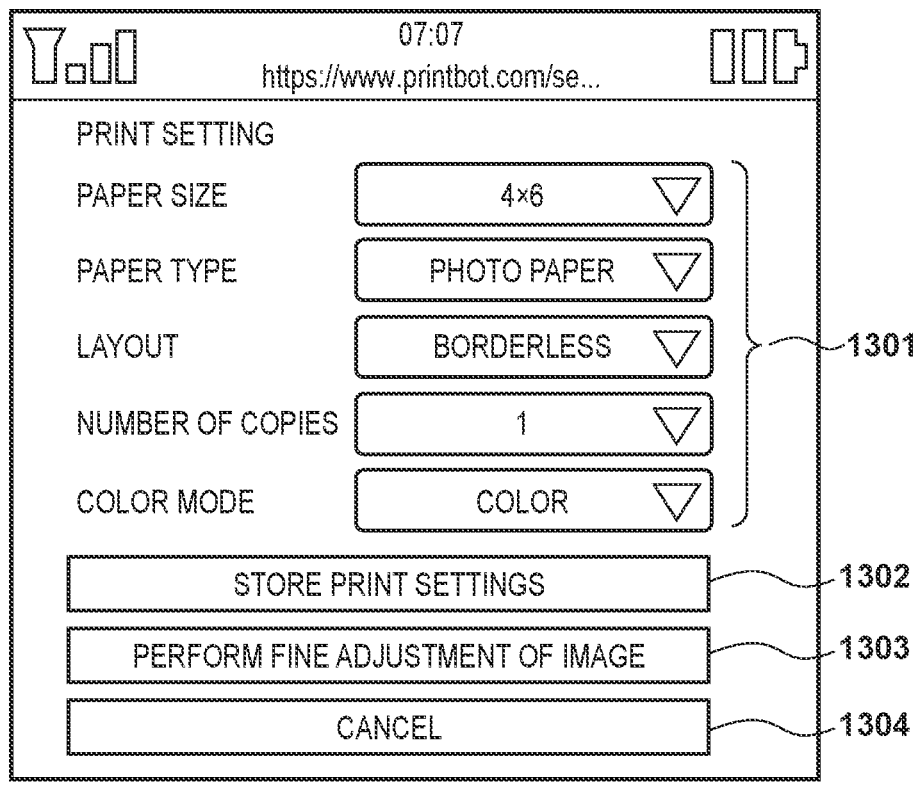
FIG. 13A is a diagram illustrating an example of a print setting web page displayed by a web browser.
Figure 13B:
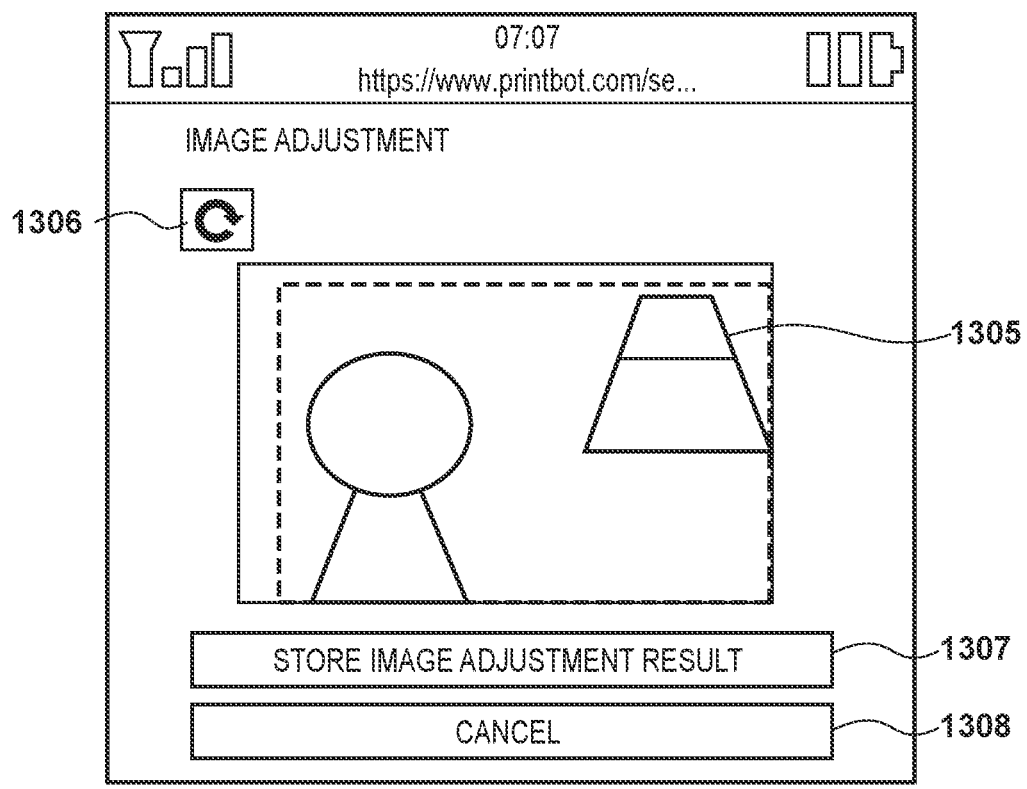
FIG. 13B is a diagram illustrating an example of a print setting web page displayed by a web browser.

FIGS. 13A and 13B illustrate examples of web pages returned in S11141. FIG. 13A illustrates an example of a screen for making print settings. Print setting items such as paper size, type, and layout can be changed. When a button 1302 in the lower part of the screen is pressed, the print setting information is updated in accordance with each print setting item selected at that time and information on position adjustment performed on an adjustment screen for the print area of a file in FIG. 13B to be described later, and then the web browser 120 is terminated. When a button 1303 is pressed, the screen shifts to the adjustment screen for the print area of a file illustrated in FIG. 13B. When a button 1304 is pressed, contents of the print settings that have been changed are discarded, and the web browser 120 is terminated.

On the adjustment screen for the print area of a file, a rectangular area having the same aspect ratio as a paper size set in print settings 1301 is superimposed and displayed on a region 1305 for displaying a print target file. In this region, the print area can be adjusted by performing translation or resizing of a file area by user operation. Also, by pressing a rotation button 1306, the file can be rotated with respect to the rectangular area of a paper size. When a button 1307 is pressed, the screen returns to the print setting screen of FIG. 13A in a state in which file position information such as a changed position, a changed scaling factor, and rotation information are saved. When a button 1308 is pressed, the changed information is discarded, and the screen returns to the print setting screen of FIG. 13A.

In the present embodiment, the screen returns to the print setting screen of FIG. 13A when the button 1307 or 1308 on the adjustment screen fix the print area of a file illustrated in FIG. 13B is pressed. However, print settings may be updated from the adjustment screen for the print area of a file when the button 1307 or 1308 is pressed.

When the user changes print settings on the print setting web page and instructs the update of the print settings by pressing the button 1302, the web browser 120 transmits a print setting update request to the web application 320 (S1115). The print setting update request includes an identifier for uniquely identifying the print request information that is a target of print setting change, the print setting information specified by the user on the print setting web page, and the file position information specified by the user on the adjustment screen for the print area of a file. The web application 320, which has received the print setting update request in S1115, updates the print setting information of the corresponding print request information stored in the database 330 (S1116). The web application 320 transmits a response notifying that the print setting update has been received, to the web browser 120 that has transmitted the print setting update request in S1115 (S1117). Upon receiving the response transmitted in S1117, the web browser 120 closes the print setting web page (S1118).

Figure 14:
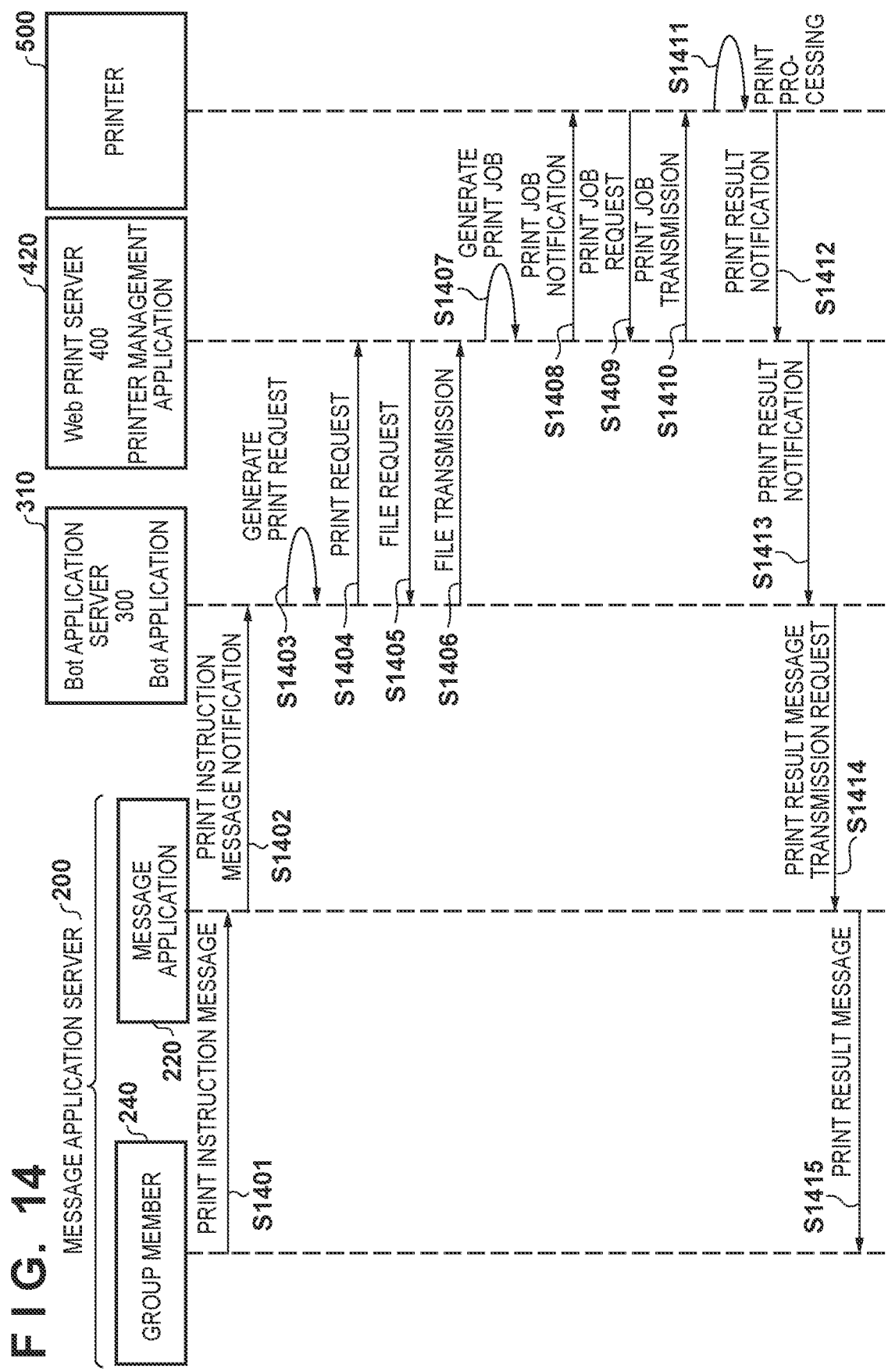
FIG. 14 is a sequence diagram of process in which a group member issues a print instruction and causes a printer to execute a print job via a web print server.

FIG. 14 is a sequence diagram illustrating, a process in which, after the print setting process described with reference to FIG. 11, the user operates the client terminal 100 to issue a print instruction, causes the printer 500 to print a target file in accordance with print settings specified by the user, and obtains a print result.

When the button 1204 in the example of the file reception response message illustrated in FIG. 12 is pressed, a print instruction message is transmitted from the client application 110 to the message application 220 of the message application server 200 (S1401). Here, the print instruction message includes identification information for identifying the client application 110 that is the transmission source of the print instruction, and the identifier of the print request information included in the file reception response message.

Upon receiving the print instruction message, the message application 220 transmits a print instruction message notification to the bot application 310 (S1402). The print instruction message notification transmitted in S1402 also includes the identification information for identifying the client application 110 and the identification information of the print request information included in the print instruction message of S1401.

Subsequently, the bot application 310 retrieves, from the database 330, print request information that matches the identification information of the print request included in the print instruction message notification, and generates a print request based on the print request information (S1403). Then, the bot application 310 transmits the print request generated in S1403 to the printer management application 420 of the web print server 400 (S1404).

The printer management application 420, which has received the print request, snakes a request for a file to the bot application 310 based on storage destination information of the file included in the print request information (S1405).

In response to the request for the file, the bot application 310 retrieves the corresponding file from the file storage 340 and transmits the file to the printer management application 420 (S1406). The printer management application 420 generates a print job based on the print request information received in S1404 and the file acquired in S1406 (S1407).

The printer management application 420 transmits a print job notification for notifying the printer 500 that the print job has been generated (S1408). The printer 500, which has received the print job notification, makes a request for the print job to the printer management application 420 (S1409). The printer management application 420, which has received the request for the print job, transmits the print job as a response to the printer 500 (S1410). The printer 500, which has received the print job, performs an output with an output device 507 based on the print job (S1411). Upon completion of the output, the printer 500 transmits a print result notification to the printer management application 420 (S1412). The printer management application 420, which has received the print result notification, transmits a print result notification to the bot application 310 (S1413). The bot application 310, which has received the print result notification, transmits to the message application 220 a request for transmitting a print result notification message (S1414). The message application 220, which has received the request for transmitting the print result message, transmits the print result message to the client application 110 (S1415).

As described above, in the system according to the present embodiment, a member in a group in a message application adds a predetermined account corresponding to a bot application. In response to the addition of the predetermined account, the bot application associates the group in the message application with a predetermined printer. Accordingly, when a member of the group issues a print instruction, the print instruction can be output to the predetermined printer associated, and the printer can be shared in the group.

Second Embodiment

In the first embodiment, a process in which a bot application is added to a group and a group member 240 registers a printer has been described. However, even in a case where a group member has registered a printer before joining the group, it is necessary to perform again a registration process including operation of the printer. Therefore, in the present embodiment, a process in which information of a user who has registered a printer before joining a group is used in the group so as to easily associate the printer with the group will be described. Note that the same processes, configurations, and functions as those of the first embodiment are denoted by the same reference numerals and the description thereof are omitted.

Figure 15:
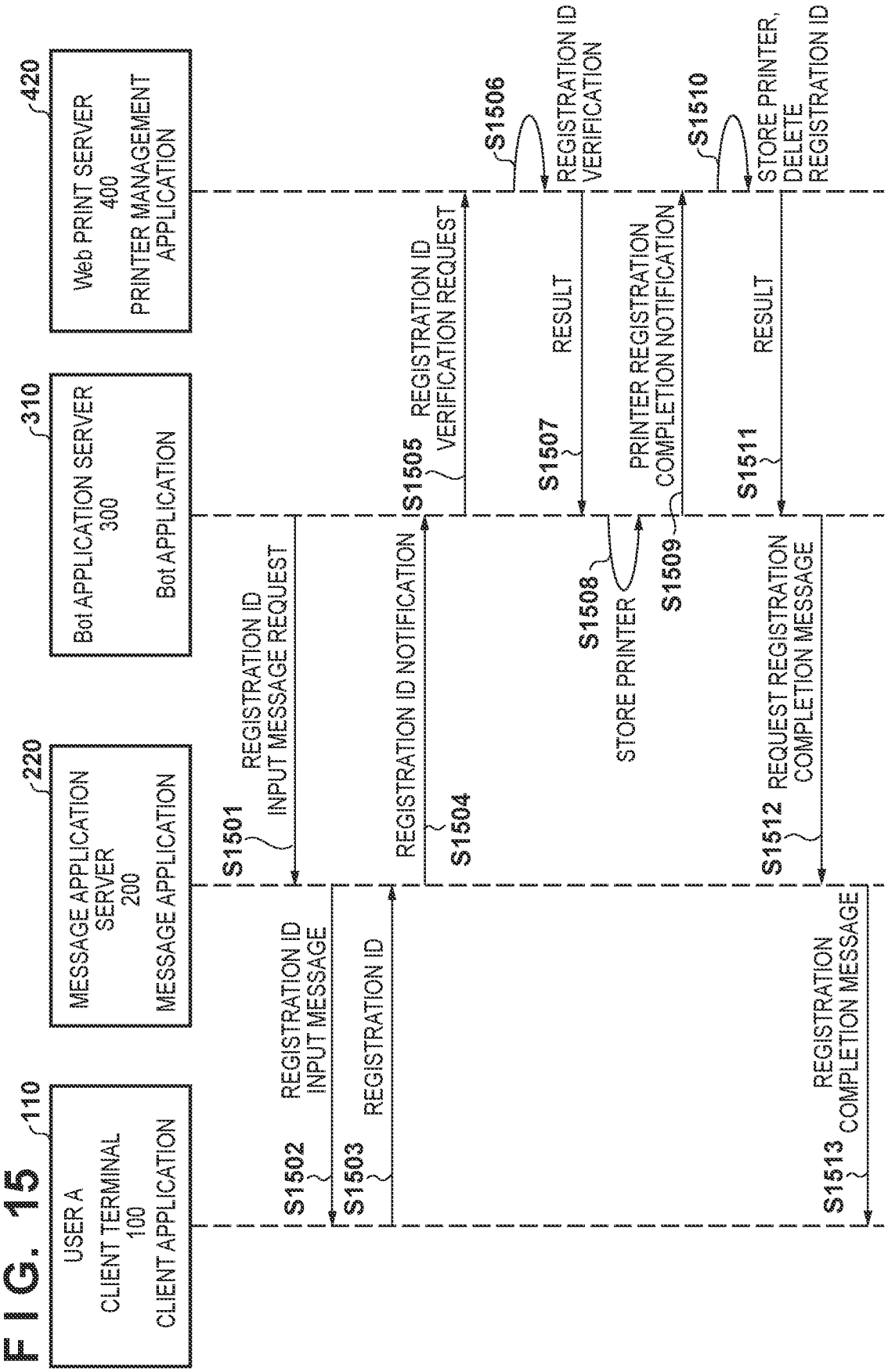
FIG. 15 is a sequence diagram illustrating registration process of a group member and a printer according to a second embodiment.

FIG. 15 is a sequence diagram illustrating a registration process of the client application 110 and the printer 500.

Figure 16:
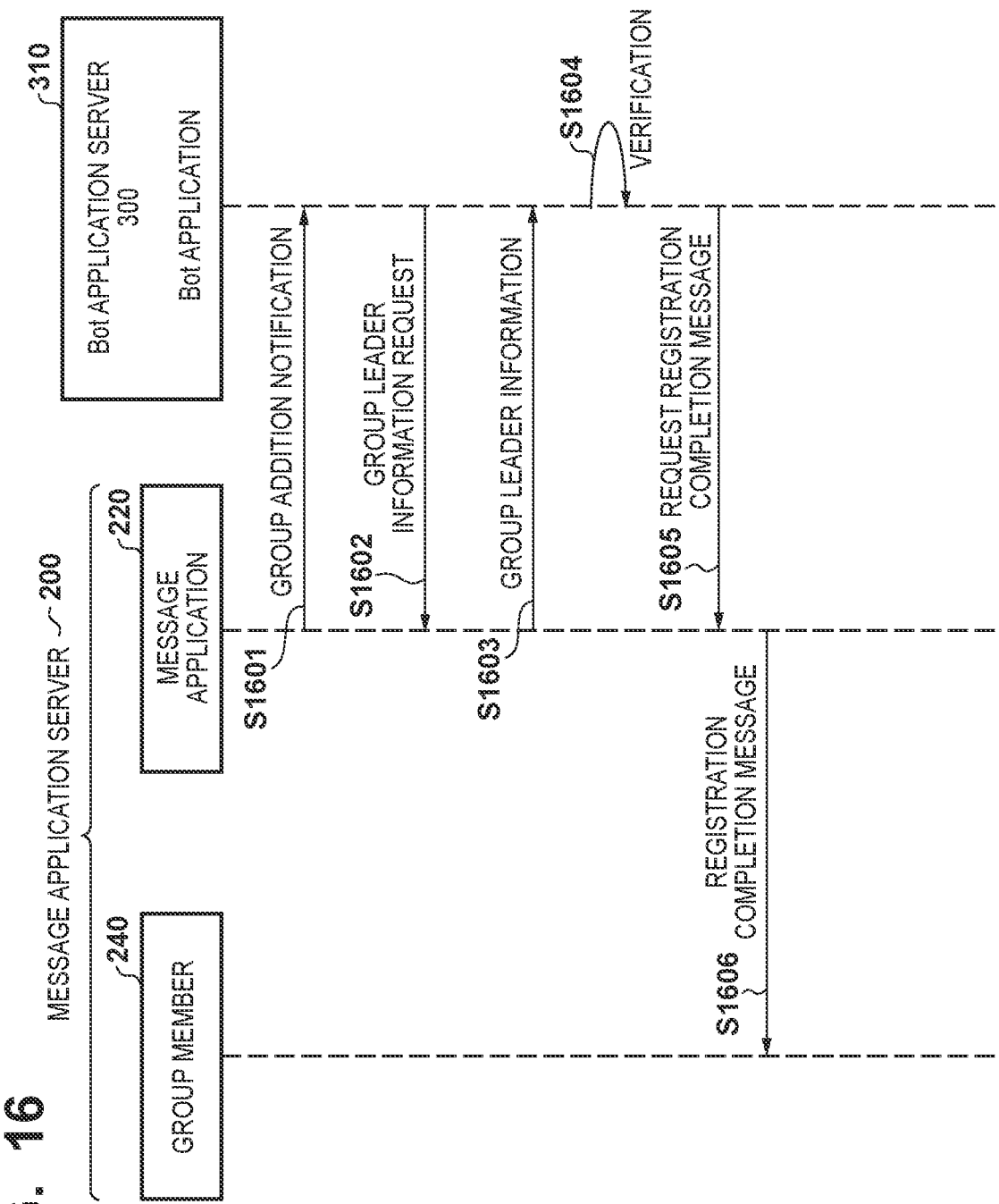
FIG. 16 is a sequence diagram of a process in which a user A who has registered a printer creates an intra-message-application group and registers a printer in the group according to a second embodiment.

First, the bot application 310 transmits to the message application server 200 a registration ID input message request for registering the printer 500 (S1501). Upon receiving a registration ID input message from the message application server 200 (S1502), the client application 110 of the user A performs a process of registering the printer 500. After the registration of the printer 500 is completed in the process described above, a group is created and another user and the bot application 310 are added to the group in the same procedure as in FIGS. 5 (S1503 to S1513). The processes in S1503 to S1513 are similar to those in S904 to S914 described with reference to FIG. 9, and thus detailed descriptions thereof are omitted, FIG. 16 is a sequence diagram of a procedure for registering the group member 240 and the printer 500 after adding the bot application 310 to the group. Upon receiving a group addition notification (S1601), the bot application 310 makes a request for the information of a group leader 250 to the message application 220 (S1602). The information requested in S1602 may be information of a creator of the group if the group leader 250 is not assigned to the group. The information requested here includes an identifier for uniquely identifying the group leader 250. Further, in a case where identifiers for uniquely identifying the group leader 250 and the group are included in the group addition approval request transmitted in S506, the identifiers are stored in the database 430. Then, the request of S1602 can be omitted by acquiring information of the group leader 250 from the identifier of the group to which the group leader 250 belongs.

The message application 220, which has received the request for the information of the group leader in S1602, returns the requested information of the group leader 250 (S1603). The group leader information returned in S1603 includes an identifier for uniquely identifying the group leader 250.

Subsequently, the bot application 310 verifies whether or not registration information of the group leader 250 and the printer 500 exists in the database 3311 based on the identifier of the group leader 250 received in S1603 (S1604). In a case where the registration information exists, registration information of the group and the printer 500 is newly recorded in the database 330 and a registration completion message request is transmitted to the message application 220 (S1605). In a case where the registration information does not exist, the printer registration process illustrated in FIG. 9 is performed with respect to the group member 240. The message application 220, which has received the registration completion message request in S1605, transmits a registration completion message to the group member 240.

As described above, when a user account for which printer has already been registered is added to the group, the printer is automatically added to the group. Thus, the operation of registering the printer 500 to the group can be omitted. This makes it unnecessary to perform again the registration of the printer including operation of the printer when associating the printer with the group, providing improved convenience.

Third Embodiment

In the second embodiment, an example of a method of registering a printer, which has already been registered to a group leader, to a group has been described. However, for example, there may be a case where it is desirable to limit functions available to a group member when the group member performs printing with a printer already registered to a group leader. In the present embodiment, a process in which a group leader approves the use of a function in a printing process when a group member other than the group leader performs the printing process will be described. Note that the same processes, configurations, and functions as those of the first and the second embodiments are denoted by the same reference numerals and the descriptions thereof are omitted.

Figure 17:
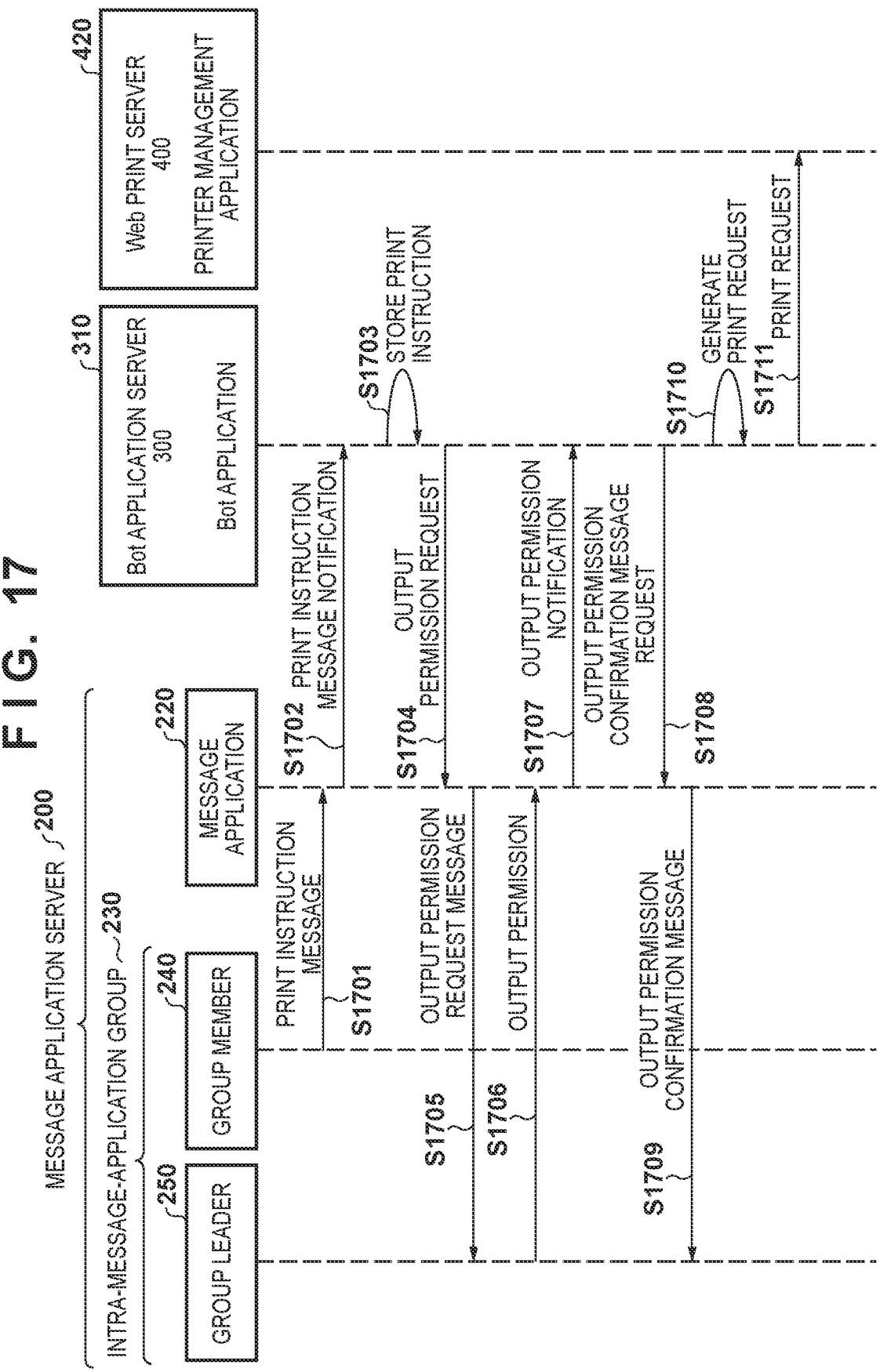
FIG. 17 is a sequence diagram of a process in which a group leader approves a use permission to a print instruction issued by a group member according to a third embodiment.

FIG. 17 is a sequence diagram in which a print instruction is issued to the printer 500, which is registered in advance by the user A as the group leader 250, by another group member 240, as described in the second embodiment. The group member 240 here includes the user B who is a member other than the user A. The process of issuing a print instruction for printing a print document is similar to the process described in FIG. 11, and thus the detailed description thereof is omitted.

FIG. 17 illustrates a process in which the user B as the group member 240 transmits a print instruction to the printer 500 registered by the user A as the group leader 250, and a print request is transmitted from the bot application 310 to the printer management application 420.

The message application 220, which has received a print instruction message in S1701, transmits a print instruction message notification to the bot application 310 (S1702). The notification includes an identifier for uniquely identifying the group member 240 who has transmitted the instruction message.

The bot application 310, which has received the print instruction message notification from the group member 240 other than the group leader 250, generates an identifier for uniquely identifying the content of the print instruction. Then, the bot application 310 stores the content of the print instruction associating with the identifier in the data base 330 of the bot application server 300 (S1703). Then, the bot application 310 transmits to the message application 220 an output permission request requesting the group leader 250 for a permission to perform an output (S1704). The above request includes the content of the print instruction which may be the identifier for identifying the content of the print instruction.

The message application 220, which has received the output permission request in S1704, transmits an output permission request message to the group leader 250 (S1705). The output permission request message may be transmitted in a one-to-one talk room (message group) between the group leader 250 and the bot account so that only the group leader 250 can receive the output permission request message, or may be transmitted so that the member other than the group leader 250 can also receive the output permission request message.

Figure 18:
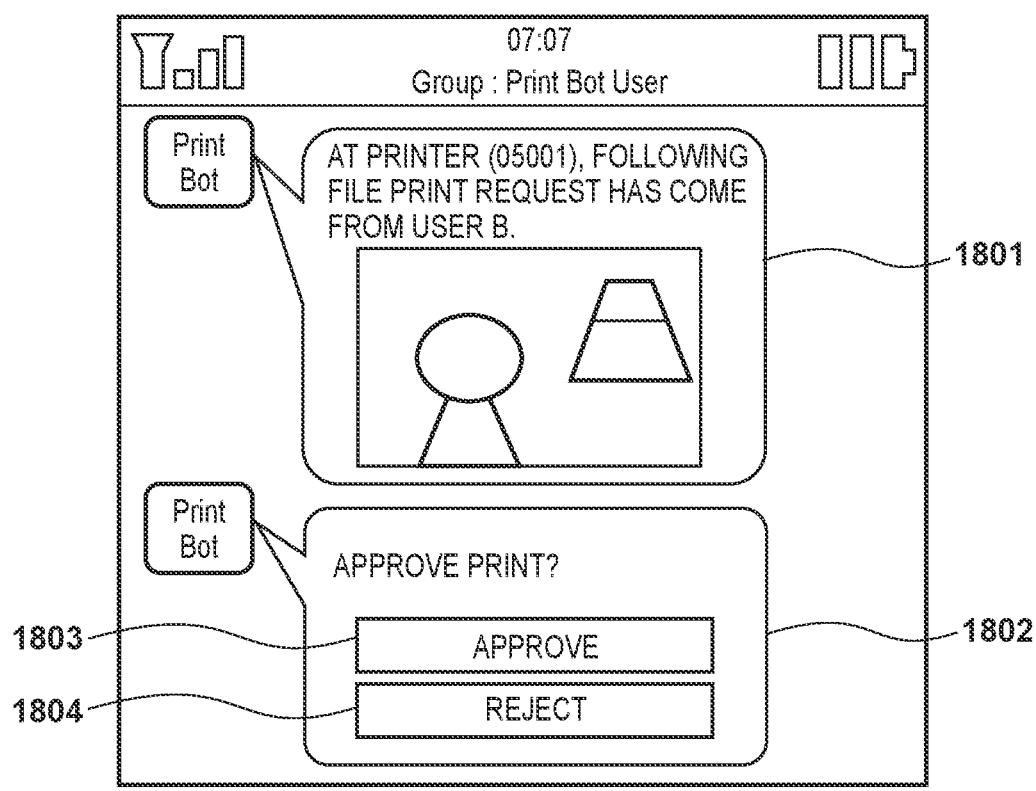
FIG. 18 is a diagram illustrating a use approval screen displayed by a client application.

FIG. 18 illustrates an example of the output permission request message of S1705 displayed by the client application 110. A message 1801 includes the output permission request from the bot application 310 and the content of the print instruction. A message 1802 is a message for selecting whether or not to permit an output, and buttons 1803 and 1804 may be arranged therein. The request message here includes the identifiers of the group member 240 who has transmitted the print instruction and the printer 500 that performs printing. When the button is selected, a response to the output permission request message is transmitted to the message application 220 (S1706 in FIG. 17). The response includes the identifier of the content of the print instruction.

The message application 220, which has received an output permission, transmits an output permission notification to the bot application 310 (S1707). In a case where the group leader 250 has rejected the request, then a rejection notification is transmitted instead.

The bot application 310, which has received the output permission notification in S1707, transmits an output permission confirmation message request to the message application 220 (S1708), and generates a print request (S1710). In a case where the rejection notification is received, the content of the print instruction stored in the database 330 is deleted based on the identifier of the content of the print instruction. At that time, a request for a message notifying the group member 240 who has transmitted the print instruction of the rejection may be transmitted to the message application 220. The message application 220, which has received the output permission confirmation message request in S1708, transmits an output permission confirmation message to the group leader 250 (S1709).

The bot application 310 generates the print request based on the content of the print instruction stored in the database 330 (S1710). Then, the bot application 310 transmits the generated print request to the printer management application 420 of the web print server 400 (S1711).

As described above, according to the present embodiment, when the group member 240 other than the group leader 250 wants to perform printing process, the group leader 250 can determine whether or not to permit the printing.

Other Embodiments

In the first to third embodiments, a case where a printer can be shared when a bot application is added as one account of a message application has been described. However, there may be a case where a printer only needs to be shared when a user who has registered the printer joins a group, and, for example, the function of the printer to be shared or the transmission and reception of print target data may be provided as one function in the message application. In that case, the message application may instruct to output the print target data in response to a message of the group. Alternatively, an external application that can acquire a message of the message application may perform sharing of a printer among the group, the transmission and reception of the print target data, and the output of a print instruction.

In addition, in the first to third embodiments, descriptions have been given on the assumption that an account or a group in a message application and a printer are registered by transmitting a character string displayed on the printer to an account corresponding to a bot application as a message of the message application. However, the registration may be performed by another process as long as the account or the group in the message application to be associated with the printer can be identified. For example, in a case where the printer includes an input interface, the registration of the printer may be performed by inputting an identifier of the account or the group in the message application into the printer.

Embodiment(s) of the present invention can also be realized by a computer of a system or apparatus that reads out and executes computer executable instructions e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-109413, filed on Jun. 30, 2021, which is hereby incorporated by reference herein in its entirety,

What is claimed is:

1. An information processing method executed by an information processing system cooperatively operating with a message application, the method comprising:
   registering by associating a group in the message application with a predetermined image recording device in response to an instruction by a first account in the group; and
   outputting print target data transmitted from the message application to the predetermined image recording device in response to a message transmitted by a second account in the group,
   wherein, after the group is created based on an operation by the first account and the second account is added to the group, an image recording device associated with the first account is identified, and the identified image recording device is associated with the group,
   the method further comprising acquiring information pertaining to the image recording device associated with the first account in the message application, and
   in the registering, when the second account is added to the group by the first account, the image recording device associated with the first account is identified based on the information acquired in the acquiring.

2. The information processing method according to claim 1, wherein the first account is an account having a management right over the group.

3. The information processing method according to claim 1, wherein
   the predetermined image recording device displays a character string for adding the predetermined account to the group in response to user operation, and
   in the registering, when the character string is input in a message in the group, the group and the predetermined image recording device are associated with each other.

4. The information processing method according to claim 3, wherein, in the registering, when the character string is input in the message application within a predetermined time period from a time when the predetermined image recording device displays the character string, an association with the predetermined image recording device is established.

5. The information processing method according to claim 1, further comprising setting print settings used when the data is output by the image recording device, wherein
   in the outputting, the print settings are further output.

6. The information processing method according to claim 1, wherein, in the outputting, an output permission request message requesting for a permission to perform an output is transmitted to the first account, and when a permission to perform an output is received in response to the output permission request message, the data is output.

7. The information processing method according to claim 6, wherein the output permission request message is transmitted in a one-to-one message group between the first account and the predetermined account.

8. The information processing method according to claim 1, wherein the data is included in a message transmitted in the group.

9. The information processing method according to claim 1, wherein the data is included in a message transmitted in a one-to-one message group between the second account and the predetermined account.

10. An information processing system comprising: a first information processing device configured to cooperatively operate with a message application; and a second information processing device configured to instruct an image recording device to perform printing in response to an instruction from the first information processing device,
    the first information processing device including,
    at least one processor; and
    at least one memory storing a program to be executed by the at least one processor, wherein the at least one processor executes the program to function as:
    a registration unit configured to associate a group in the message application with a predetermined image recording device in response to addition of a predetermined account to the group by a first account; and
    an output unit configured to output print target data transmitted in the message application to the predetermined image recording device in response to a message transmitted by a second account in the group, and
    the second information processing device including
    at least one processor; and
    at least one memory storing a program to be executed by the at least one processor, wherein the at least one processor executes the program to function as:
    an instruction unit configured to receive the data from the output unit and instruct the predetermined image recording device to perform printing,
    wherein, after the group is created based on an operation by the first account and the second account is added to the group, an image recording device associated with the first account is identified, and the identified image recording device is associated with the group,
    wherein the at least one processor of the first information processing device further executes the program to function as an acquiring unit configured to acquire information pertaining to the image recording device associated with the first account in the message application, and
    wherein the registration unit is configured to, when the second account is added to the group by the first account, identify the image recording device associated with the first account based on the information acquired by the acquiring unit.

11. An information processing device configured to cooperatively operate with a message application, the device comprising:
    at least one processor; and
    at least one memory storing a program to be executed by the at least one processor,
    wherein the at least one processor executes the program to function as:
    a registration unit configured to associate a group in the message application with a predetermined image recording device in response to addition of a predetermined account to the group by a first account in the message application, and
    an output unit configured to output print target data transmitted in the message application to the predetermined image recording device in response to a message transmitted by a second account in the group, wherein, after the group is created based on an operation by the first account and the second account is added to the group, an image recording device associated with the first account is identified, and the identified image recording device is associated with the group, wherein the at least one processor further executes the program to function as an acquiring unit configured to acquire information pertaining to the image recording device associated with the first account in the message application, and wherein the registration unit is configured to, when the second account is added to the group by the first account, identify the image recording device associated with the first account based on the information acquired by the acquiring unit.

12. A non-transitory computer-readable storage medium storing a program for causing a computer to execute the information processing method according to claim 1.

* * * * *